US008606250B1

(12) United States Patent
Sutardja

(10) Patent No.: US 8,606,250 B1
(45) Date of Patent: *Dec. 10, 2013

(54) METHOD AND APPARATUS FOR PROVIDING A MOBILE WIRELESS LOCAL AREA NETWORK

(75) Inventor: Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,959

(22) Filed: Aug. 14, 2012

Related U.S. Application Data

(63) Continuation of application No. 10/875,362, filed on Jun. 24, 2004, now Pat. No. 8,244,228.

(51) Int. Cl.
*H04M 3/56* (2006.01)

(52) U.S. Cl.
USPC .... 455/416; 455/41.2; 455/552.1; 455/553.1; 455/518; 455/519; 370/260; 379/202.01

(58) Field of Classification Search
USPC .......... 379/202.01, 204.01, 205.01, 158, 157; 370/260; 455/416, 518, 519, 41.2
See application file for complete search history.

(56) References Cited

U.S. PATENT DOCUMENTS

| | | |
|---|---|---|
| 6,904,023 B2 | 6/2005 | Albal et al. |
| 6,957,069 B2 | 10/2005 | Shah et al. |
| 7,376,091 B1 | 5/2008 | Eccles et al. |
| 2003/0092433 A1 | 5/2003 | Flannery |
| 2004/0264410 A1 | 12/2004 | Sagi et al. |
| 2005/0070288 A1 | 3/2005 | Belkin et al. |
| 2005/0070303 A1 | 3/2005 | Lagno et al. |
| 2005/0073964 A1 | 4/2005 | Schmidt et al. |
| 2005/0090238 A1 | 4/2005 | Lai et al. |

OTHER PUBLICATIONS 802.11 n; IEEE P802.11-04/0889r6; Wireless LANs, TGn Sync Proposal Technical Specification; May 2005; 135 pages.

ANSI/IEEE 802.11, Information technology—Telecommunications and information exchange between systems—Local and metropolitan area networks—Specific requirements, Part 11: Wireless LAN Medium Access Control (MAC) and Physical Layer (PHY) specifications, 1999 Edition, pp. 1-512.

IEEE P802.11g/D8.2 Draft Supplement to Standard for Information technology—Telecommunications and information exchange between systems—Local and metropolitan area networks—Specific requirements, Part 11: Wireless LAN Medium Access Control (MAC) and Physical Layer (PHY) specifications, Further Higher Data Rate Extension in the 2.4 GHz Band, Apr. 2003, pp. 1-69.

(Continued)

*Primary Examiner* — Kiet Doan
*Assistant Examiner* — Dung Lam

(57) ABSTRACT

A first mobile device includes an access point configured to control access of a plurality of second mobile devices to a wireless local area network. A conference controller is configured to control a teleconference between the plurality of second mobile devices accessing the wireless local area network via the access point. The teleconference includes a communication link compatible with the wireless local area network protocol, the communication link including a first information stream that is packet-based and a second information stream that is compatible with a mobile device network. An IP interface is configured to convert, for transmission to the plurality of second mobile devices in the second information stream, portions of the first information stream received from the wireless local area network, and convert, for transmission to the wireless local area network in the first information stream, portions of the second information stream received from the second mobile devices.

17 Claims, 3 Drawing Sheets

(56) References Cited

OTHER PUBLICATIONS

IEEE Std 802.11 h-2003 (Amendment to IEEE Std 802.11, 1999 Edition (Reaff 2003)); as amended by IEEE Stds 802.11 a-1999, 802.11 b-1999, 802.11 b-1999/Cor 1-2001, 802.11 d-2001, and 802.11g-2003; IEEE Standard for Information technology—Telecommunications and information exchange between systems—Local and metropolitan area networks—Specific requirements- Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE std. 802.11a, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications, High-speed Physical Layer in the 5 GHz Band, Adopted by the ISO/IEC and redesignated as ISO/IEC 8802-11: 1999/Amd 1:2000(E), pp. 1-83.

IEEE std. 802.11b, Supplement to IEEE Standard for Information technology—Telecommunications and information exchange between systems—Local and metropolitan area networks—Specific requirements, Part 11: Wireless LAN Medium Access Control (MAC) and Physical Layer (PHY) specifications: Higher-Speed Physical Layer Extension in the 2.4 GHz Band, Sep. 16, 1999, pp. 1-89.

METHOD AND APPARATUS FOR PROVIDING A MOBILE WIRELESS LOCAL AREA NETWORK

CROSS-REFERENCE TO RELATED APPLICATIONS

This application is a continuation of U.S. patent application Ser. No. 10/875,362 (now U.S. Pat. No. 8,244,228) filed on Jun. 24, 2004. The disclosure of the above application is incorporated herein by reference in its entirety.

TECHNICAL FIELD

An aspect of this invention relates to wireless communication system.

BACKGROUND

Wireless devices have become an important component of modern communication systems. Cellular phones and personal digital assistants (PDAs) are just a couple of the wireless devices that that have expanded peer-to-peer communications. Cellular phones provide mobile communication links between peers enabling people to communicate over vast distances while on the move.

Although cellular phones have expanded the mobility of peer to-peer communications, the communication links associated with cellular phones are typically limited to being managed and controlled via the cellular system. Because of the reliance on the cellular system, cellular phone operation may be limited when operated in some environments such as inside buildings that may degrade the reception and transmission of signals between the mobile units and base stations. In addition, audible communication with the mobile units is typically limited to being controlled through the cellular system.

SUMMARY

A cellular phone comprising a wireless Local Area Network (LAN) transceiver to transmit and receive packet data based communications. A cellular transceiver to transmit and receive standard cellular system based communications. A communication interface in communication between the wireless LAN transceiver, the cellular transceiver, and an input.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

The present disclosure will become more fully understood from the detailed description and the accompanying drawings, wherein.

Like reference symbols in the various drawings indicate like elements.

DESCRIPTION

Figure 1:
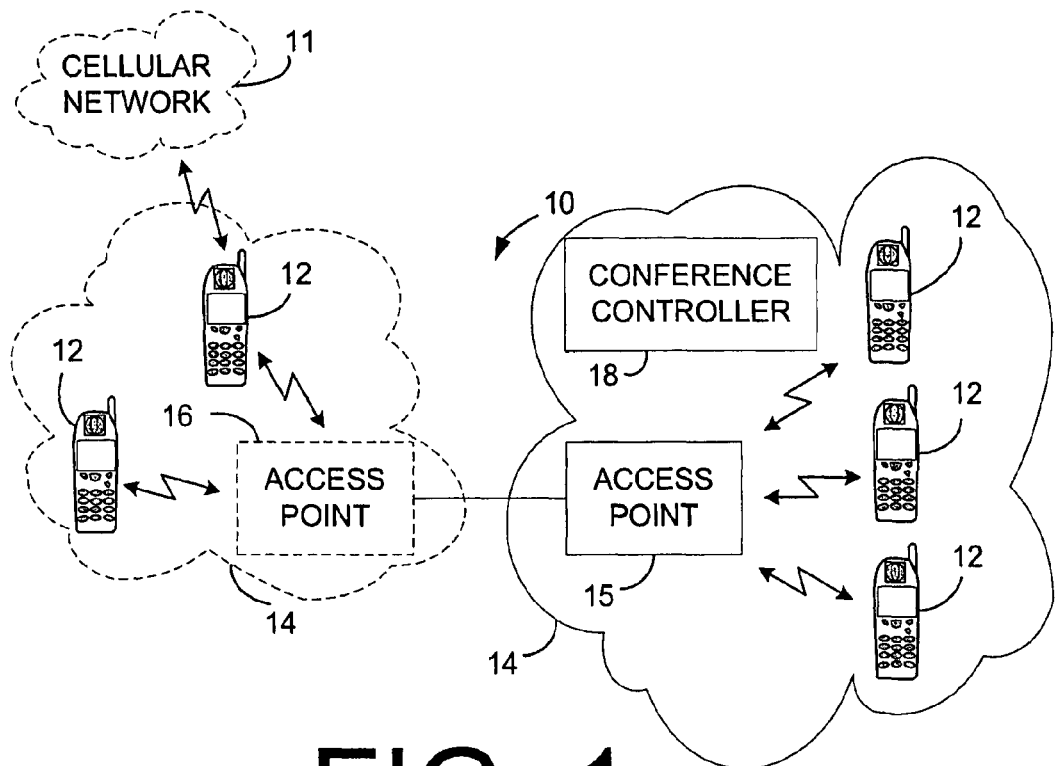
FIG. 1 is a block diagram of an aspect of a conferencing system.

FIG. 1 shows a block diagram of an aspect of a communication system 10 for teleconferencing two or more cellular phones 12 through a wireless local area network (LAN) 14. The wireless LAN 14 may be based on any type of network standard such as Ethernet and Token Ring. The cellular phones 12 may communicate through the LAN 14 in accordance with any wireless LAN protocol such as one of the IEEE wireless LAN standards including 802.11, 802.11(a), 802.11(b), 802.11(g), 802.11(h), and 802.11(n), as well as Bluetooth, and infrared. The LAN 14 may be arranged in any type of configuration such as a star configuration, a daisy chain configuration, and combinations of star and daisy chain configurations. The cellular phones 12 may connect to the wireless LAN 14 through an access point 15. The access point 15 may be located anywhere such as being included in one or more of the cellular phones 12, integrated into a part of a LAN that includes devices other than the cellular phones 12, and an access point that is dedicated to the cellular phones 12. The cellular phones 12 may include a wireless LAN transceiver to communicate information to and from the access point 15.

The wireless LAN 14 may include a conference controller 18 to manage the communication links between the cellular phones 12. The conference controller 18 may use Voice Over Internet Protocol (VoIP) technology for controlling the flow of communication between the cellular phones 12. The conference controller 18 may be located with the access point 16, as a portion of one or more of the cellular phones 12, as a separate entity, distributed across several LAN devices such as the cellular phones 12, and be included with another network device on the LAN 14. The conference controller 18 may control packet based communication between three or more of the cellular phones 12 that are interconnected through the wireless LAN 14. One or more of the cellular phones 12 may communicate to a standard cellular network 11 based on a wireless technique such as Code Division Multiple Access (COMA), Time Division Multiple Access (TDMA), and Global System for Mobile communication (GSM).

Figure 2:
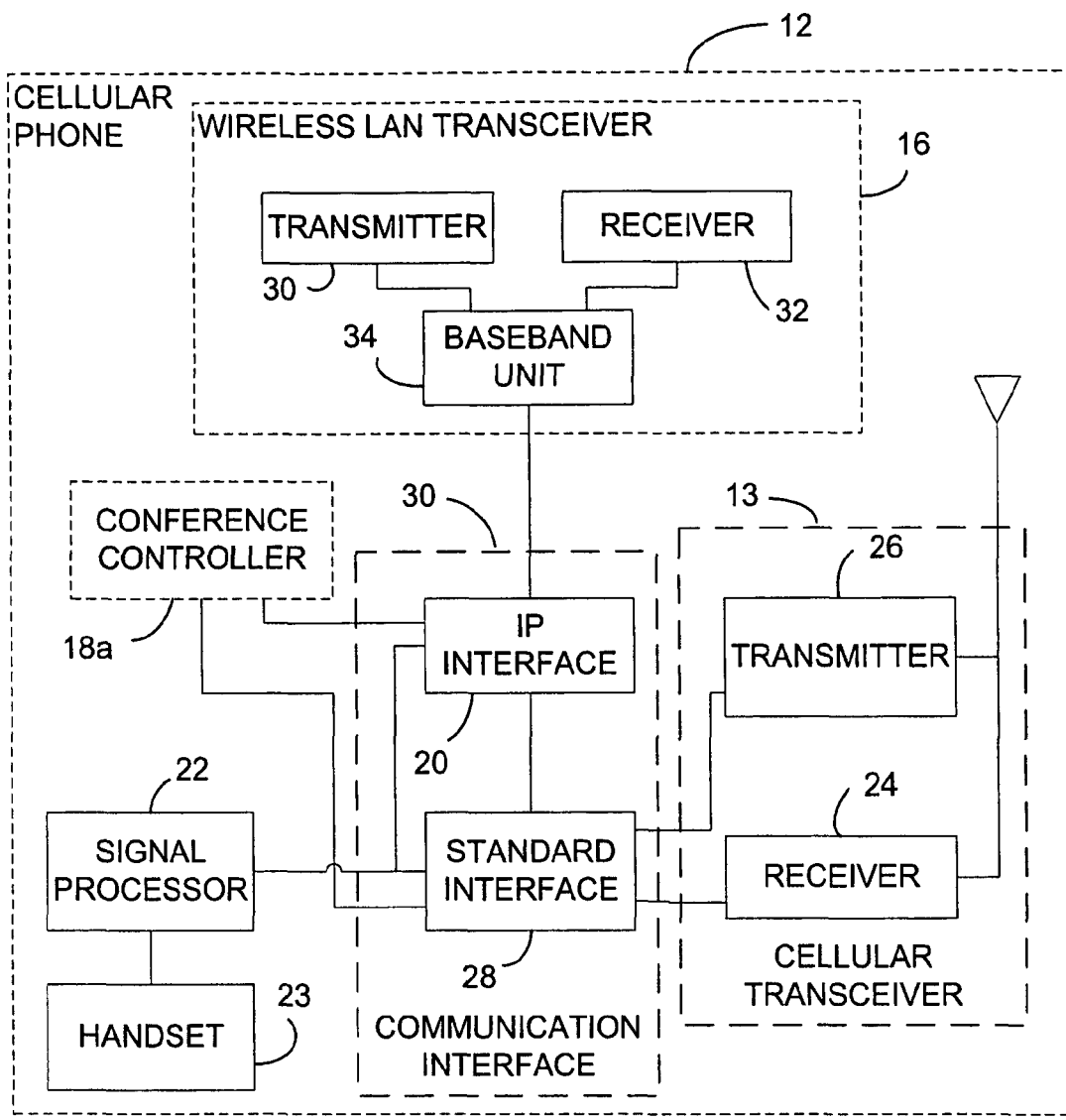
FIG. 2 is a block diagram of an aspect of a cellular phone for operation with the conferencing system.

FIG. 2 shows an aspect of a cellular phone 12 having a cellular transceiver 13 and a wireless LAN transceiver 16 to transmit and receive communications. The cellular transceiver 13 may include a receiver 24 and a transmitter 26 for communicating an information stream to and from a standard cellular phone network.

The wireless LAN transceiver 16 may include a transmitter 30 and a receiver 32 to communicate a packet based information stream to and from a LAN. A baseband unit 34 may manage formatting and physical channels and links associated with the packet based information stream.

A communication interface 30 may control the communication format of the cellular phone 12. The communication interface 30 may include an IP interface 20 and a standard interface 28. The IP interface 20 may convert an information stream of the cellular phone 12 to and from packet data that is compatible with a wireless LAN protocol such as those described above. For example, the IP interface 20 may receive an information stream from a signal processor 22 in the cellular phone 12. The IP interface 20 may convert the information stream to a flow of packet data that complies with an appropriate wireless LAN protocol. The converted and formatted packet data may be transmitted by the transmitter 30 to an access point and to one or more other cellular phones 12. In another aspect, the receiver 32 may receive packet data which the IP interface 20 may convert to digital data to be processed by the signal processor 22. A bridge connection between the IP interface 20 and the standard interface 28 may facilitate the flow of information from the IP interface 20 to the standard interface 28.

The standard interface 28 may operate in conjunction with the IP interface 20 to interface the information stream of the signal processor 22 with a standard cellular phone network that may be based on a wireless technique such as Code Division Multiple Access (CDMA), Time Division Multiple Access (TDMA), and Global System for Mobile communication (GSM). The cellular phone 12 may automatically switch between the IP interface 20 and the standard interface 28 as a function of the information stream and the digital data.

The IP interface 20 may also operate as an access point to the wireless LAN 14 to facilitate operation as any wireless LAN protocol such as those described above. A conference controller 18a may be included in the cellular phone 12 to control packet based communication between two or more cellular phones. In one aspect the conference controller 18a may be a centralized entity located in a single cellular phone 12 to control a teleconference with several other cellular phones. In another aspect the conference controller 18a may be a distributed entity having portions located in each cellular phone that is included in a teleconference.

A handset 23 in communication with the signal processor 22 may include a microphone, a speaker, and a keyboard as an interface to a user of the cellular phone 12.

Figure 3:
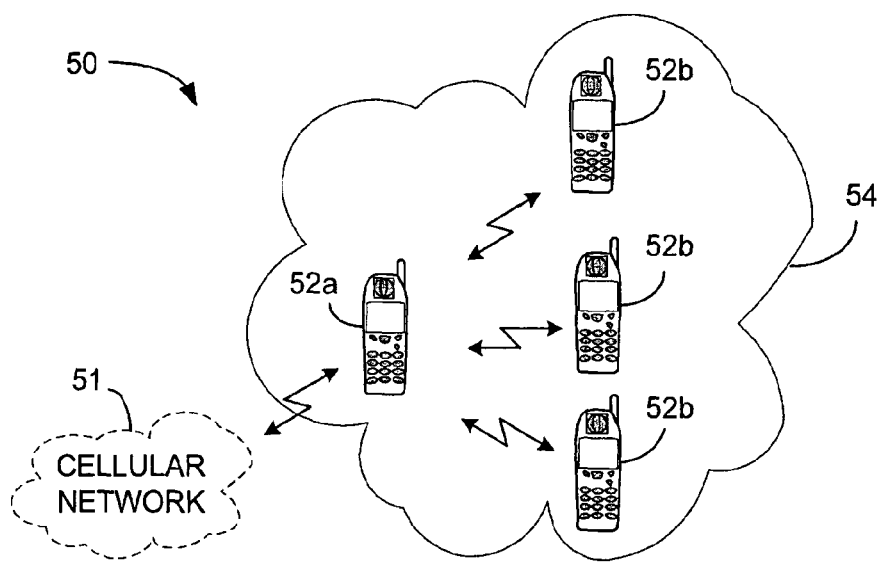
FIG. 3 is a block diagram of another aspect of a conferencing system.

FIG. 3 shows an aspect of a communication system 50 similar in function to the communication system 10. The communication system 50 includes a wireless LAN 54 having a star configuration. The wireless LAN 54 comprises several cellular phones 52a and 52b of which one cellular phone 52a includes an access point module to control access to a wireless LAN 54. One or more of the other cellular phones 52b may establish a communication link through the access point to form a teleconference. Each of the cellular phones 52a and 52b includes an IP interface for packet based communication. In combination, the cellular phones 52a and 52b may form the entire wireless LAN 54, or the wireless LAN 54 may include other network devices. The cellular phone 52a may include a conference controller 56 to manage packet based communication links during a teleconference between two or more of the cellular phones 52a and 52b. One or more of the cellular phones 52a and 52b may communicate to a standard cellular network 51 based on a wireless technique described above.

Figure 4:
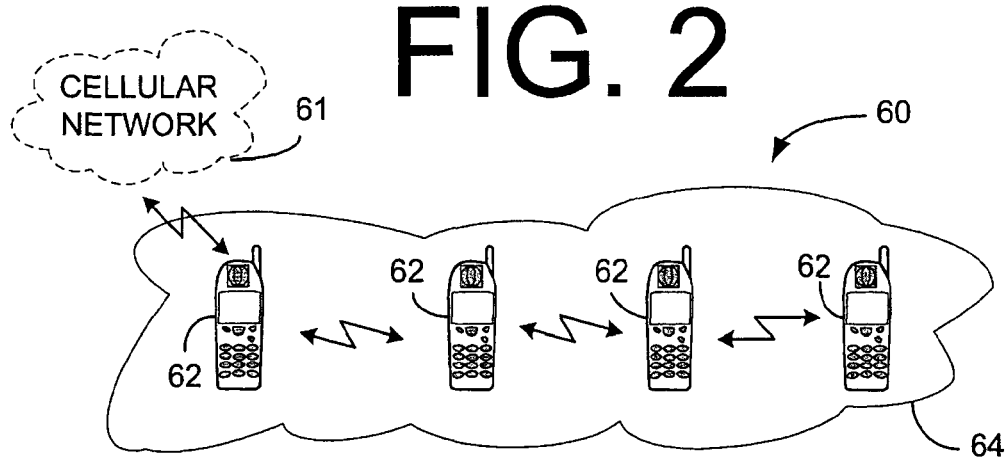
FIG. 4 is a block diagram of another aspect of a conferencing system.

FIG. 4 shows an aspect of another communication system 60 similar in function to the communication system 10. The communication system 60 includes a wireless LAN 64 having a daisy chain configuration of two or more cellular phones 62. Each of the cellular phones 62 includes an IP interface for packet based communication and an access point module to control access to a wireless LAN 64 formed by the cellular phones 64. Each of the cellular phones 62 may also include a conference controller to control packet based communication links during a teleconference between two or more of the cellular phones 62. The daisy chain configuration advantageously reduces the processing power required to conduct the teleconference by distributing the processing load across the cellular phones 62. One or more of the cellular phones 62 may communicate to a standard cellular network 61 based on a wireless technique described above.

Figure 5:
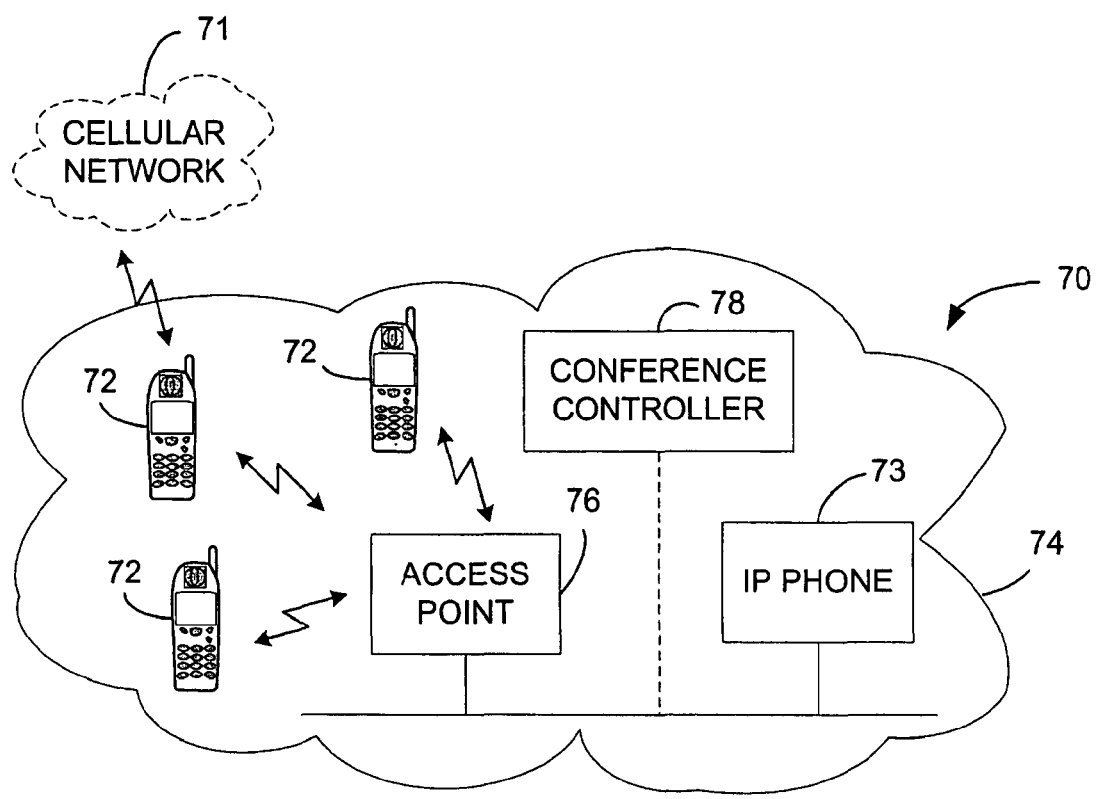
FIG. 5 is a block diagram of another aspect of a conferencing system.

FIG. 5 shows an aspect of another communication system 70 similar in function to the communication system 10. The communication system 70 includes a LAN 74 for interconnecting several cellular phones 72 and at least one Internet Protocol (IP) phone 73. The LAN 72 may comply with any wired network standard such as Ethernet and Token Ring. The LAN includes a wired connection to the IP phone 73 and wireless connections through an access point 76 to the cellular phones 72. Each of the cellular phones 72 includes an IP interface for packet based communication. A conference controller 78 may control packet based communication links between the IP phone 73 and the cellular phones 72 during a teleconference of two or more of the phones 72 and 73. The conference controller 78 may be located anywhere on the LAN 74 such as being distributed within each of the cellular phones 72, co-located with the access point 76, and located as a separate entity on the LAN 74. One or more of the cellular phones 72 may communicate to a standard cellular network 71 based on a wireless technique described above.

A number of embodiments of the invention have been described. Nevertheless, it will be understood that various modifications may be made without departing from the spirit and scope of the invention. Accordingly, other embodiments are within the scope of the following claims.

What is claimed is:

1. A first mobile device, comprising:
    an access point configured to control access of a plurality of second mobile devices to a wireless local area network according to 802.11 wireless local area network protocol;
    a conference controller configured to control a teleconference between the plurality of second mobile devices accessing the wireless local area network via the access point, wherein the teleconference includes a communication link compatible with the wireless local area network protocol, the communication link including a first information stream that is packet-based and a second information stream that is compatible with a mobile device network;
    an Internet Protocol (IP) interface configured to i) convert, for transmission to the plurality of second mobile devices in the second information stream, portions of the first information stream received from the wireless local area network, and ii) convert, for transmission to the wireless local area network in the first information stream, portions of the second information stream received from the plurality of second mobile devices; and
    a wireless local area network transceiver configured to communicate the first information stream to and from the wireless local area network.

2. The first mobile device of claim 1, further comprising:
    a cellular interface configured to interface with the mobile device network.

3. The first mobile device of claim 2, further comprising:
    a bridge connection configured to facilitate communication between the IP interface and the cellular interface.

4. The first mobile device of claim 2, further comprising:
    a signal processor configured to process digital data corresponding to the first information stream and the second information stream.

5. The first mobile device of claim 4, wherein:
    the conference controller is configured to automatically switch between the IP interface and the cellular interface as a function of the digital data, the first information stream, and the second information stream.

6. The first mobile device of claim 1, wherein the mobile device network is based on at least one of Code Division Multiple Access (CDMA), Time Division Multiple Access (TDMA), and Global System for Mobile (GSM) communication.

7. The first mobile device of claim 1, further comprising:
a cellular transceiver configured to communicate the second information stream to and from the plurality of second mobile devices.

8. The first mobile device of claim 1, wherein the conference controller is configured to use Voice Over Internet Protocol (VoIP) technology to control the teleconference.

9. A system, comprising the first mobile device of claim 1, and further comprising:
the wireless local area network, wherein the wireless local area network includes at least one of a star configuration and a daisy chain configuration.

10. The first mobile device of claim 1, wherein the wireless local area network protocol includes at least one of 802.11, 802.11(a), 802.11(b), 802.11(g), 802.11(h), and 802.11(n).

11. A method of operating a first mobile device, the method comprising:
using an access point located in the first mobile device, controlling access of a plurality of second mobile devices to a wireless local area network according to 802.11 wireless local area network protocol;
controlling a teleconference between the plurality of second mobile devices accessing the wireless local area network via the access point, wherein the teleconference includes a communication link compatible with the wireless local area network protocol, the communication link including a first information stream that is packet-based and a second information stream that is compatible with a mobile device network;
converting, for transmission to the plurality of second mobile devices in the second information stream, portions of the first information stream received from the wireless local area network;
converting, for transmission to the wireless local area network in the first information stream, portions of the second information stream received from the plurality of second mobile devices; and
communicating the first information stream to and from the wireless local area network.

12. The method of claim 11, further comprising:
processing digital data corresponding to the first information stream and the second information stream.

13. The method of claim 11, wherein the mobile device network is based on at least one of Code Division Multiple Access (CDMA), Time Division Multiple Access (TDMA), and Global System for Mobile (GSM) communication.

14. The method of claim 11, further comprising:
communicating the second information stream to and from the plurality of second mobile devices.

15. The method of claim 11, wherein controlling the teleconference includes controlling the teleconference using Voice Over Internet Protocol (VoIP) technology.

16. The method of claim 11, wherein the wireless local area network includes at least one of a star configuration and a daisy chain configuration.

17. The method of claim 11, wherein the wireless local area network protocol includes at least one of 802.11, 802.11(a), 802.11(b), 802.11(g), 802.11(h), and 802.11(n).

* * * * *